June 26, 1962 B. B. ELDER ETAL 3,041,153
METHOD AND APPARATUS OF PROCESSING CHEESE
OF THE MOZZARELLA TYPE
Filed Dec. 8, 1959 2 Sheets-Sheet 1
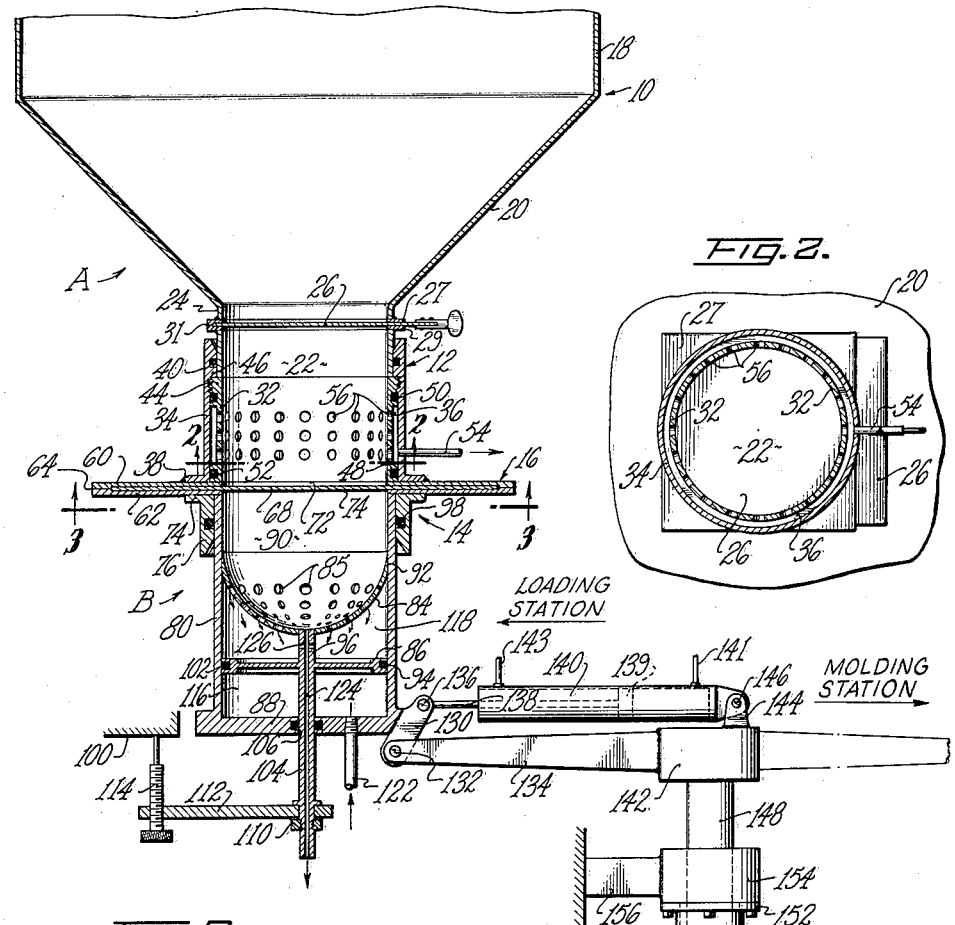
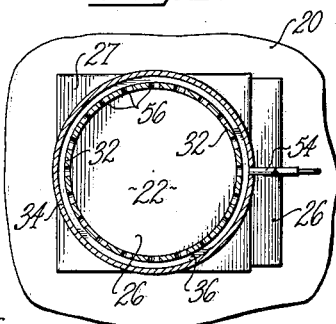
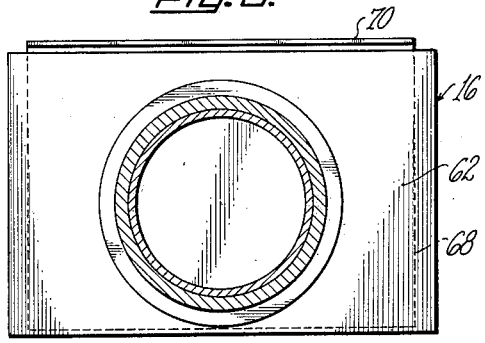
INVENTORS
BOYD B. ELDER
NICHOLAS E. PONTECORVO
BY Lynn H. Latta
ATTORNEY

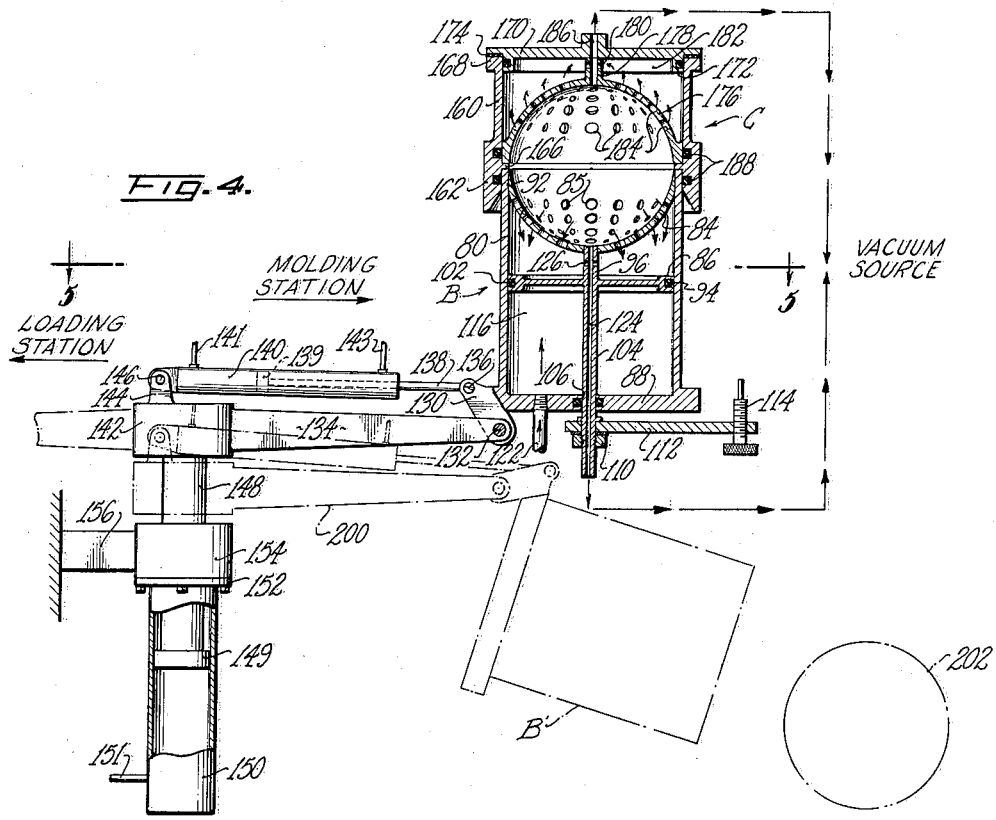
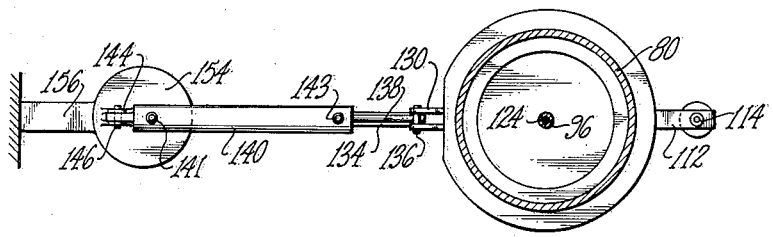

United States Patent Office 3,041,153
Patented June 26, 1962

3,041,153
METHOD AND APPARATUS OF PROCESSING CHEESE OF THE MOZZARELLA TYPE
Boyd B. Elder and Nicholas E. Pontecorvo, Los Angeles, Calif., assignors to Cheese Molding Machine Company, a general partnership consisting of Boyd B. Elder, Nicholas E. Pontecorvo, Milton M. Johnson, and David Zerner, and Primary Mold and Machine Company, a corporation of California
Filed Dec. 8, 1959, Ser. No. 858,268
18 Claims. (Cl. 31—89)

This invention relates generally to improvements in the process and apparatus used for molding cheese of the Mozzarella variety as used in making pizza. More particularly, the invention contemplates an improved molding apparatus wherein both stretching or attenuation of a measured body of cheese within the mold and withdrawal of moisture from the cheese is simultaneously accomplished through the application of a vacuum.

While various methods for the processing of Mozzarella and generally similar cheeses have been utilized before, the majority have not employed a vacuum in the molding and extrusion stages, and of those which have made use of vacuum as a power source for actuating molding apparatus, none involve a mold wherein vacuum is applied directly to the cheese for withdrawal of moisture from it. Consequently, it is a major object of this invention to provide a new and improved molding method and device in which air is withdrawn from the cheese during the molding process to achieve the desired consistency normally obtained through hand kneading.

It is a further object of the invention to provide a new and improved molding method and device whereby a vacuum is applied to a measured body of cheese within a mold to attenuate or stretch the cheese to attain approximately the same results as in kneading.

Another object of the invention is to provide a new and improved mold apparatus wherein a bottom section is transferred between alternate processing stations, one of which embodies a hopper combined with a moisture removal unit for injecting the cheese into the bottom mold and the other embodies the upper section of the mold.

A further object of the invention is to provide a new and improved cheese molding device wherein the unsanitary conditions normally encountered in the hand preparation of such cheeses is completely avoided throughout the processing of the cheese.

Various other objects and advantages of the invention will become apparent in the following specification and drawings in which:

FIG. 1 is an elevational view, partially in cross section, of the apparatus of the invention in the loading position wherein the lower portion of the mold is coupled to the filling mechanism;

FIG. 2 is a cross sectional view taken on line 2—2 of FIG. 1;

FIG. 3 is a cross sectional view taken on line 3—3 of FIG. 1;

FIG. 4 is a partial cross sectional view of the apparatus in the molding position with the two sections of the mold coupled together;

FIG. 5 is a partial cross sectional view taken on line 5—5 of FIG. 4.

Referring now to the drawings in detail, we have shown, as an illustrative example of the invention, a cheese processing apparatus comprising generally a loading unit A supported by a suitable support 14 in a fixed position at loading station (so designated by legend in FIG. 1) a lower mold unit B mounted for movements back and forth between that station and a molding station (so designated by legend in FIG. 4) and an upper mold unit C supported in a fixed position at the molding station. FIGURES 1–3 show the apparatus in its loading position with the loading mechanism A coupled to the lower mold assembly B. FIGS. 4 and 5 show the lower mold assembly at the molding station, coupled to the upper mold unit C.

*The Apparatus*

The loading mechanism A comprises principally a cheese curd hopper 10 coupled to a dehydrating jacket 12 which is separated from a concentric mold mounting ring 14 by a cut-off gate or cutter 16. Hopper 10 includes a rim 18, and a downwardly tapering body 20, terminating at its lower end in a discharge throat 22 defined by a tubular neck 24, in which a stopper valve 26, for regulating the flow of the curd from the hopper, is slidably mounted between guide plates 27 and 29 joined along their lateral edges at 31.

A continuation of throat 22 is provided by the inner wall of dehydrating jacket 12 which consists of concentric inner sleeve 32 and an outer sleeve 34. Sleeves 32, 34 are spaced to define an annular cylindrical vacuum chamber 36. In more detail, outer sleeve 34 has at its lower end an outwardly extending flange 38 for mounting jacket 12 to gate 16, and at its upper end an inwardly offset collar 40 which receives neck 24. Threaded into sleeve 34 at 42 is a flange 44 outwardly extending from the upper end of sleeve 32. The upper end of flange 44 abuts a shoulder 46 on the underside of flange 40 and also abuts the lower end of neck 24, thereby serving as a support for hopper 10. Sleeve 32 has at its lower end an outwardly extending radial flange 48 which engages the top of cutter 16 and the inner wall of sleeve 34. Vacuum chamber 36 is defined by the inner wall of sleeve 34 and the circumferential groove in the outer wall of sleeve 32 bordered by flanges 44 and 48. O-rings 50 and 52 serve to prevent any leakage between the inner wall of sleeve 34 and flanges 44 and 48, the latter having annular grooves in which the O-rings are retained.

Through a fluid line 54, vacuum is applied to chamber 36 which in turn receives moisture drawn from cheese in throat 22, through a plurality of circumferentially spaced apertures 56 in sleeve 32 which communicate vacuum chamber 36 with throat 22.

Seated against the under side of flanges 48 and 38, and welded to the latter at 58 is the upper of two rectangular plates 60 and 62 which are joined along their lateral edges at 64 to provide a slideway for a corresponding rectangular cutter blade 68 of cutter 16. Blade 68 has a turned up edge at 70 (FIG. 3) which limits the travel of the blade on the cut off stroke and facilitates its manual operation. Plates 60 and 62 have concentric openings 72 and 74, respectively, which are of equal diameter and form a continuation of throat 22. Mounted to the bottom side of lower plate 62 is the outwardly extending flange 74 of mold mounting ring 14, having a bearing collar 76 depending from flange 74.

Lower mold assembly B is comprised of a cylindrical housing 80 the inner wall of which serves as a cylinder for an integrally connected cheese mold 84 and piston 86. Mold 84 is perforated by a plurality of apertures 85. Housing 80, closed off at its lower end by a head 88, is slidably received at its open upper end by the cylindrical inner wall of mounting ring 14, and its upper end abuts the under side of plate 62, thereby supporting the entire loading mechanism A. Mold 84 is hemispherical in shape and at its equator it has a cylindrical rim wall 92 slidably bearing against the inner wall of housing 80. A loading chamber 90 is defined by the inner surface of mold 84 and that portion of the wall of housing 80 extending from its level of contact with the mold to the cutoff blade 68. Threaded into the bottom of mold 84 is a tubular stem 96, coaxial with the major axis of housing 80 and integrally connected to the web of piston 86. In the rim of piston 86 is an annular groove 94 accommodating an O-ring 102, in slidable contact with the inner wall of housing 80. Forming a continuation of stem 96 below piston 86 is a tubular stem 104 integrally connected to the underside of piston 86 and extending through an opening 106 in head 88. Secured by a nut 110 against the under side of an integral flange 108 on stem 104, is a horizontally extending arm 112 which has threaded into it a stop screw 114 for limiting upward travel of mold 84 and piston 86, by contact with a fixed support 100. Nut 110 is threaded onto the lower extremity of stem 104.

In addition to loading chamber 90, housing 80 has contained within it a pressure chamber 116, defined by the lower side of piston 86, the inner wall of housing 80 and the upper side of head 88, and a vacuum chamber 118 is defined by the upper side of piston 86, inner wall of housing and the lower side of mold 84. For upward movement of piston 86 and consequently mold 84, pressure is applied in chamber 116 through a fluid (e.g. air) pressure line 122 coupled to head 88. By means of a vacuum applied to chamber 118 through a passage 124 which extends from the lower extremity of stem 104 through said stem and terminates at ports 126 in stem 96, moisture from cheese in mold 84 is withdrawn through the mold apertures 85 into vacuum chamber 118, thence through ports 126 and passage 124. Housing 80 is sealed to bearing collar 76 by an O-ring 98 retained in an internal annular groove in collar 76 and sealed against the outer surface of housing 80.

Welded to the periphery of flange 88 of housing 80, is a short tilting lever 130, by means of which housing 80 is pivoted at its lower end on a pivot 132 mounted in the left end of a horizontally extending support arm 134. Lever 130 is connected at its upper end, by means of a pivot 136, to one end of a piston rod 138 of a fluid actuator 140 having a piston 139 on the other end of rod 138. Integral with and supporting the arm 134 is a mounting head 142 which, by means of a bracket 144 welded to its upper side, pivotally supports actuator 140 at 146. For support of the lower mold assembly B through tilting lever 130 and arm 134, and for vertical and horizontal movement of these elements, the upper end of a piston rod 148 connected to a piston 149 in a cylinder 150 is fixed to the underside of mounting head 142. Cylinder 150 has for its rigid support a flange 152 bolted to the underside of a mounting ring 154 which is in turn supported by an integral wall bracket arm 156.

Referring now to FIGS. 4 and 5, lower mold assembly B, with its tilting and supporting mechanism (after rotation of piston rod 148 through 180° about its axis) is positioned at the molding station, coupled to upper mold assembly C. Assembly C includes a housing 160 which has at its lower end a thickened cylindrical collar 162 receiving the upper end of housing 80 of lower mold assembly B. Collar 162 has an inwardly extending annular shoulder 166 with a diameter equal to that of the inner wall of housing 80. Shoulder 166 engages the upper end of housing 80, thereby serving as a positioning stop for housing 80. Upper mold assembly C is supported by any suitable support (not shown) in a fixed position at the molding station. At the upper end of housing 160 is a rim 168 which supports a cap 170 having a downwardly extending flange 172, fitted within rim 168 and seating against a rubber gasket 174 to seal off the upper end of housing 160. Mounted within housing 160 is a hemispherical upper mold section 176 which is seated on shoulder 166 at its lower end, thereby forming a complete spherical mold in conjunction with mold 84 of lower mold assembly B when the latter has been moved upward from its original position in housing 80 to engage beneath the shoulder 166. Integral with and extending upwardly from the top of upper mold section 176 is a hollow stem 178, the upper end of which is sealed to the underside of cap 174 and engages it to maintain mold 176 in position. The vertical passage in stem 178 communicates, at its lower end, through lateral ports 180, with a vacuum chamber 182 defined by housing 160 and upper mold section 176. Through apertures 184 in upper mold section 176, vacuum chamber 182 communicates with the interior of the mold for withdrawal of moisture from and attenuation of cheese within the mold. Vacuum chamber 182 is evacuated by means of an outlet 186 in cap 170, communicating with the open upper end of stem 178. Vacuum (subatmospheric pressure) may be applied by a suitable vacuum pump, designated "Vacuum Source" in the drawings. Suitable suction lines may be utilized to connect the outlets 186 and 124 to the vacuum source as indicated by the lines of arrows in FIG. 4. Alternatively, separate vacuum sources for each of these outlets could be utilized. O-rings 188 in collar 162, retained in internal annular grooves therein, serve to seal the mold sections 176 and 84 to the housings 80 and 160 respectively.

*The Method*

In referring to the operation of the aforescribed apparatus, first in the loading station position (FIG. 1), mixed Mozzarella cheese curd is placed in hopper 10, butterfly valve 26 and cutter blade 68 being in open positions so as to allow the curd to flow through throat 22 of hopper 10 into dehydrating jacket 12 to which a vacuum is constantly applied through line 54 for withdrawal of moisture from the cheese through holes 56 in sleeve 32, and into loading chamber 90 of lower mold assembly B. At the same time atmospheric air pressure is applied to the bottom of piston 86 through pressure line 122 to maintain lower section mold 84 within housing 80 at a position determined by the setting of stop screw 114 which abuts stationary support 100. Upon complete filling of lower mold section 84 and loading chamber 90, cutter blade 68 is actuated to the closed position, thereby cutting off a measured amount of cheese in the lower mold assembly and preventing the flow of any more curd from hopper 10. Simultaneously, a vacuum is applied to lower vacuum chamber 118 through ports 126 and passage 124 for continual withdrawal of moisture through holes 85 in mold 84, and with resultant attenuation of the curd.

In transferring from the loading station to the molding station, lower mold assembly B is lowered so as to be completely disengaged from the coupling collar 76. This is accomplished by release of pressure, applied through line 151 and cylinder 150, to the bottom of a piston 149 on the lower end of piston rod 148. After dropping to the position indicated by broken line 200 (FIG. 3) lower mold assembly B is transferred to the molding station by rotating piston rod 148 about its axis, through 180°, vacuum being continually applied to the cheese in lower mold section 84, throughout the station-changing operation. At the molding station, lower mold housing B is again elevated to engage the upper end of housing 80 against the under side of annular shoulder 166 in stationary hopper mold assembly C. Upon thus coupling the upper and lower mold assemblies A and B, vacuum is applied to vacuum chamber 182 of the upper assembly through ports 180 and outlet 186, thereby evacuating air from the cheese in the mold through apertures 184, and causing mold section 84 to move to its upward limit position as shown in FIG. 4, by the action of atmospheric pressure through line 122 on the underside of piston 86. The withdrawal of moisture and the attenuation of the cheese in the mold is uniformly effected throughout the body of cheese by continuing the application of vacuum to the lower vacuum chamber 118 simultaneously with the application of vacuum to the upper vacuum chamber 182. The two mold sections 84 and 176 are held in coupled position for a period of time to allow for the shaping of the cheese into the desired ball form. After the molding period is completed, the vacuum in chamber 182 of the upper mold assembly C is released and the lower mold 84 is withdrawn into cylinder 80 by the vacuum still being applied to it in chamber 118. Upon complete withdrawal of the mold and piston 86 within cylinder 80, the vacuum applied to chamber 118 is stopped, lower mold assembly B is again lowered by releasing of pressure under piston 153 in cylinder 150 through line 151, to the position indicated by dotted lines 200, and pressure is applied to a piston in cylinder 140 through line 141, thereby actuating piston rod 138 so as to pivot tilting arm 130 about pin 132, and subsequently place lower mold assembly B in the position indicated by broken line B'. At this point, pressure is applied through line 122 to the under side of piston 86 in cylinder 80 whereupon it and mold 84 are moved towards the open end of cylinder 80, thereby ejecting the cheese in the form of a ball as indicated at 202. By applying pressure through line 143 to the other side of the piston is cylinder 140, lower mold assembly B is subsequently righted and transferred to the loading station whereupon the whole process is repeated again.

We claim:

1. Apparatus for processing cheese of the type of which the Mozzarella variety is representative, comprising: a loading unit, means on which said unit is supported in a fixed position constituting a loading station, a lower mold unit movable between said loading station and a molding station horizontally spaced from said loading station, and an upper mold unit supported in a fixed position at said molding station; said loading unit including a hopper having at its lower end a gate valve providing a discharge outlet for delivering cheese curd to said lower mold unit, and including a cut-off gate slidably mounted for movements between a closed position providing a closed bottom for said hopper and an open position in which said outlet is open for delivering cheese curd into said lower mold unit; said lower mold unit comprising a tubular housing adapted for coupling to said outlet, supporting means for transporting said housing horizontally between said loading and molding stations and for effecting vertical movements thereof to couple and uncouple said housing with reference to said loading unit outlet at the loading station and with reference to said upper mold unit at the molding station, a perforated lower mold section vertically slidable in said housing between a lowered position for receiving and measuring a quantity of cheese curd within said housing at its upper end, and a raised position for moving the upper portion of said curd into the upper mold unit; means cooperating with the lower side of said lower mold section and said housing to define a vacuum chamber; means providing a connection between a source of vacuum and said vacuum chamber for evacuating air and moisture from within said lower mold section through said vacuum chamber; and means for lowering and elevating said lower mold section.

2. Apparatus as defined in claim 1, wherein said lower mold unit has an open cylindrical upper end, wherein said loading unit includes a cylindrical coupling collar on the underside of said gate valve and defining said outlet, said open upper end of said lower mold unit housing being receivable within said coupling collar, and said upper mold unit including means defining a mouth adapted to receive the upper end of said lower mold unit housing for coupling the same to said upper mold unit.

3. Apparatus as defined in claim 1, wherein said upper unit includes a perforated upper mold section, a housing around said upper mold section, defining therewith a vacuum chamber, and a vacuum line connected to said housing and communicating with said vacuum chamber for withdrawing air and moisture from said upper mold section through said vacuum chamber.

4. Apparatus for processing cheese of the type of which the Mozzarella variety is representative, comprising: a loading unit, means on which said unit is supported in a fixed position constituting a loading station, a lower mold unit movable between said loading station and a molding station horizontally spaced from said loading station, and an upper mold unit supported in a fixed position at said molding station; said loading unit including a hopper having a discharge neck for delivering cheese curd to said lower mold unit, a jacket surrounding said neck and radially spaced therefrom to define an annular first vacuum chamber, a vacuum line communicating with said chamber through said jacket, said discharge neck defining a throat internally thereof and having a plurality of apertures communicating said throat with said vacuum chamber for evacuating air and moisture from said cheese curd into said vacuum chamber and thence into said vacuum line for attenuation of said curd, and a gate valve providing an outlet for said neck and including a cut-off gate mounted for sliding movements in a horizontal plane between a closed position providing a closed bottom for said neck and an open position in which said outlet is open for delivering cheese curd into said lower mold unit; said lower mold unit including supporting means for transporting the same horizontally between said loading and molding stations and for effecting vertical movements thereof to couple and uncouple said lower mold unit with reference to said discharge neck outlet at the loading station and with reference to said upper mold unit at the molding station, said loading unit and lower mold unit being cooperable for measuring a quantity of cheese curd which said lower mold unit is adapted to support and transport to said molding station after said attenuation at the loading station; said lower mold unit, when moved to a raised position at the molding station, being operable for moving the upper portion of said curd body into the upper mold unit.

5. Apparatus as defined in claim 4, wherein said upper mold unit comprises a perforated upper mold section, a housing around said upper mold section, defining therewith a vacuum chamber, a vacuum line connected to said housing and communicating with said vacuum chamber for withdrawing air and moisture from said upper mold section through said vacuum chamber to further attenuate said curd while being molded to a selected form at said molding station, and means for coupling said lower mold unit to said upper mold unit.

6. Apparatus as defined in claim 5, wherein said lower mold unit comprises a tubular housing, and a perforated lower mold section vertically slidable in said housing between a lowered position for receiving and measuring a quantity of cheese curd within said housing at its upper end, and a raised position for moving the upper portion of said curd body into the upper mold section.

7. Apparatus for processing cheese of the type of which the Mozzarella variety is representative, comprising: a loading unit, means on which said unit is supported in a fixed position constituting a loading station, a lower mold unit movable between said loading station and a molding station horizontally spaced from said loading station, and an upper mold unit supported in a fixed position at said molding station; said loading unit including a hopper having a discharge port for delivering cheese curd to said lower mold unit, and a gate valve at the lower end of said hopper, including a cut-off gate mounted for sliding movements between a closed position providing a closed bottom for said hopper and an open position in which said port is open for delivering cheese curd into said lower mold unit, and means for coupling said lower mold unit to said gate valve for receiving the curd; said lower mold unit comprising a tubular housing, supporting means for transporting said housing horizontally between said loading and molding stations and for effecting vertical axial movements thereof to couple and uncouple said housing with reference to said coupling collar at the loading station and with reference to said upper mold unit at the molding station, a perforated lower mold section vertically slidable in said housing between a lowered position for receiving and measuring a quantity of cheese curd within said housing at its upper end, and a raised position for moving the upper portion of said curd body into the upper mold section, a piston slidable in said housing below said lower mold section and defining therewith in said housing a vacuum chamber, a tubular stem connecting said piston to said lower mold section for transmitting said movements thereto and providing a connection between a source of vacuum and with said vacuum chamber for evacuating air and moisture from within said lower mold section through said vacuum chamber for attenuation of the curd, a head closing the bottom of said housing and defining therewithin, below said piston, a fluid pressure actuator chamber, and a pressure fluid line connected to said housing and communicating with said actuator chamber for elevating said piston and lower mold section.

8. Apparatus as defined in claim 7, wherein said upper mold unit comprises a perforated upper mold section, a housing around said upper mold section, defining therewith an upper vacuum chamber, a vacuum line connected to said housing and communicating with said upper vacuum chamber for withdrawing air and moisture from said upper mold section through said upper vacuum chamber for further attenuation of the curd, and means defining a mouth for said upper mold section, adapted to receive the upper end of said lower mold unit housing for coupling the same to said upper mold unit.

9. Apparatus for processing cheese of the type of which the Mozzarella variety is representative, comprising: a loading unit, means on which said unit is supported in a fixed position contributing a loading station, a lower mold unit movable between said loading station and a molding station horizontally spaced from said loading station, and an upper mold unit supported in a fixed position at said molding station; said loading unit including a hopper having a discharge neck for delivering cheese curd to said upper mold unit, and a gate valve at the lower end of said hopper, providing an outlet and including a cut-off gate mounted for sliding movements between a closed position providing a closed bottom for said hopper and an open position in which said outlet is open for delivering cheese curd into said lower mold unit, and a coupling collar carried by and registering with said neck and depending therefrom below said gate; said lower mold unit comprising a tubular housing, supporting means for transporting said housing horizontally between said loading and molding stations and for effecting vertical axial movements thereof to couple and uncouple said housing with reference to said coupling collar at the loading station and with reference to said upper mold unit, a lower mold section vertically slidable in said housing between a lowered position for receiving and measuring a quantity of cheese curd within said housing at its upper end, and a raised position for moving the upper portion of said curd body into the upper mold section, means for lowering and elevating said lower mold section for selectively coupling and uncoupling it to and from said loading unit and said molding unit respectively; said upper mold unit comprising a perforated upper mold section, a housing around said upper mold section, defining therewith a vacuum chamber, a vacuum line connected to said housing and communicating with said vacuum chamber for withdrawing air and moisture from said upper mold section through said vacuum chamber, and means defining a mouth for said upper mold section, adapted to receive the upper end of said lower mold unit housing for coupling the same to said upper mold unit and said lower and upper mold sections together in closed relation.

10. Apparatus as defined in claim 9, wherein said loading unit includes a discharge neck at the lower end of said hopper, a jacket surrounding said neck and radially spaced therefrom to define an annular first vacuum chamber, a vacuum line communicating with said chamber through said jacket, said discharge neck, defining a throat internally thereof and having a plurality of apertures communicating said throat with said vacuum chamber for evacuating air and moisture from said cheese curd into said vacuum chamber and thence into said vacuum line.

11. Apparatus for processing cheese of the type of which the Mozzarella variety is representative, comprising: a loading unit, means on which said unit is supported in a fixed position constituting a loading station, a lower mold unit movable between said loading station and a molding station horizontally spaced from said loading station, and an upper mold unit supported in a fixed position at said molding station; said loading unit including a hopper having a discharge neck for delivering cheese curd to said lower mold unit, a jacket surrounding said neck and radially spaced therefrom to define an annular first vacuum chamber, a vacuum line communicating with said chamber through said jacket, said discharge neck defining a throat internally thereof and having a plurality of apertures communicating said throat with said vacuum chamber for evacuating air and moisture from said cheese curd into said vacuum chamber and thence into said vacuum line, a cut-off gate mounted at the lower end of said neck for movements between a closed position providing a closed bottom for said neck and an open position in which the lower end of said neck is fully open for delivering cheese curd into said lower mold unit, and a coupling collar carried by and registering with said neck and depending therefrom below said gate; said lower mold unit comprising a tubular housing, supporting means for transporting said housing horizontally between said loading and molding stations and for effecting vertical axial movements thereof to couple and uncouple said housing with reference to said coupling collar at the loading station and with reference to said upper mold unit, a perforated lower mold section vertically slidable in said housing between a lowered position for receiving and measuring a quantity of cheese curd within said housing at its upper end, and a raised position for moving the upper portion of said curd into the upper mold section, a piston slidable in said housing below said lower mold section and defining therewith in said housing a vacuum chamber, a tubular stem connecting said piston to said lower mold section for transmitting said movements thereto and providing a connection between a source of vacuum and with said vacuum chamber for evacuating air and moisture from within said lower mold section through said vacuum chamber, a head closing the bottom of said housing and defining within said housing, below said piston, a fluid pressure actuator chamber, and a pressure fluid line connected to said housing and communicating with said actuator chamber for elevating said piston and lower mold section; said upper mold unit comprising a perforated upper mold section, a housing around said upper mold section, defining therewith a vacuum chamber, a vacuum line connected to said housing and communicating with said vacuum chamber for withdrawing air and moisture from said upper mold section through said vacuum chamber, and means defining a mouth for said upper mold section, adapted to receive the upper end of said lower mold unit housing for coupling the same to said upper mold unit.

12. A method of processing cheese of the type of which the Mozzarella variety is representative, including the following steps: delivering cheese curd into a lower mold unit at a loading station and simultaneously applying vacuum to the curd to withdraw air and moisture therefrom for attenuating the curd; measuring a selected quantity of the curd in the lower mold unit in accordance with the quantity of cheese desired in a finished molded cheese article; transferring the lower mold unit, with said measured quantity of curd supported therein, to a molding station and coupling it to an upper mold unit; contracting the curd between said upper and lower mold units to mold it into a selected form while simultaneously applying suction to the curd to further attenuate the curd into the desired cheese consistency; and then discharging the resultant molded product from said mold units.

13. A method of processing cheese of the type of which the Mozzarella variety is representative, including the following steps: simultaneously delivering cheese curd at a loading station and measuring a selected quantity of the curd in accordance with the quantity of cheese desired in a finished molded cheese article; applying suction to the curd during said delivering and measuring, to attenuate the curd; transferring said measured quantity of curd to a molding station; contracting the curd and molding it into a selected form while simultaneously applying suction to the curd to further attenuate the curd into the desired cheese consistency; and then discharging the resultant molded product.

14. A method of processing cheese of the type of which the Mozzarella variety is representative, including the following steps: delivering cheese curd into a lower mold unit at a loading station and simultaneously measuring a selected quantity of the curd in the lower mold unit in accordance with the quantity of cheese desired in a finished molded cheese article; closing off the top of the lower mold unit above the measured quantity of curd therein; applying suction to the curd in the lower mold unit to attenuate the curd; transferring the lower mold unit, with said measured quantity of curd supported therein, to a molding station and coupling it to an upper mold unit; contracting the curd between said upper and lower mold units to mold it into a selected form; and then discharging the resultant molded product.

15. A method of processing cheese of the type of which the Mozzarella variety is representative, including the following steps: delivering cheese curd into a lower mold unit at a loading station and simultaneously applying vacuum to the curd to withdraw air and moisture therefrom for attenuating the curd; measuring a selected quantity of the curd in the lower mold unit in accordance with the quantity of cheese desired in a finished molded cheese article; closing off the top of the lower mold unit above the measured quantity of curd therein; applying suction to the curd in the lower mold unit to further attenuate the curd; transferring the lower mold unit with said measured quantity of curd supported therein, to a molding station and coupling it to an upper mold unit; expressing the curd upwardly from the lower mold unit into the upper mold unit and contracting the curd between said upper and lower mold units to mold it into a selected form while simultaneously applying suction to the mold as defined between said lower mold section and said upper mold section, to further attenuate the curd into the desired cheese consistency; and then discharging the resultant molded product.

16. A method of processing cheese to attain an attenuated structure, including the following steps: delivering cheese curd into a lower mold unit at a loading station and simultaneously measuring a selected quantity of curd in said lower mold unit; closing off the top of the lower mold unit above the measured quantity of curd therein; transferring the lower mold unit with said measured quantity of curd supported therein, to a molding station and coupling it to an upper mold unit; simultaneously compacting and molding the cheese between the upper and lower mold units to impart a selected shape to the body of cheese; and applying suction to the curd during said molding step to develop its attenuated structure.

17. A method of processing cheese to attain an attenuated structure, including the following steps: delivering the cheese curd into a lower mold unit at a loading station and simultaneously measuring a selected quantity of the curd in said lower mold unit; applying vacuum to the curd during the delivery of the curd into said lower mold unit, for withdrawing moisture and air therefrom and thereby attenuating the curd; closing off the top of the lower mold unit above the measured quantity of curd therein; transferring the lower mold unit with said measured quantity of curd therein, to a molding station and coupling it to an upper mold unit; compacting and molding the curd between said mold units into a selected form; and then discharging the resultant mold product.

18. A method of processing cheese of attenuated structure, including the following steps: delivering the cheese curd into a lower mold unit and simultaneously measuring a selected quantity of the curd in said lower mold unit; closing off the top of the lower mold unit above said measured quantity of curd; then applying suction to the curd in the lower mold unit to attenuate the curd; transferring the lower mold unit with said measured quantity of curd therein, to a molding station and coupling it to an upper mold unit; compacting and simultaneously shaping the curd between said upper and lower mold units; and then discharging the resultant molded product.

References Cited in the file of this patent

UNITED STATES PATENTS

| | | |
|---|---|---|
| 2,331,126 | Loomis | Oct. 5, 1943 |
| 2,714,349 | Johnston | Aug. 2, 1955 |
| 2,868,651 | Manwaring | Jan. 13, 1959 |
| 2,893,121 | Mongiello | July 7, 1959 |